United States Patent
Harvey

(10) Patent No.: US 6,229,698 B1
(45) Date of Patent: May 8, 2001

(54) PORTABLE OFFICE HAVING A REMOVABLE COMPUTER WORKSTATION AND SHOCK ISOLATION MEANS THEREFOR

(76) Inventor: Stephen Harvey, 3851 Snow Rd., Las Cruces, NM (US) 88005

( * ) Notice: Subject to any disclaimer, the term of this patent is extended or adjusted under 35 U.S.C. 154(b) by 0 days.

(21) Appl. No.: 09/414,586

(22) Filed: Oct. 8, 1999

(51) Int. Cl.[7] .............................. G06F 1/16; B65D 3/02; H05K 5/00
(52) U.S. Cl. ...................... 361/683; 361/686; 364/208.1; 206/320
(58) Field of Search .................... 361/683, 681, 361/682, 686, 727, 680, 685; 364/708.1, 704, 705.1, 705.6, 708.01, 710.01, 710.13; 206/305, 320, 579, 460; 150/113; 190/110; 383/86; 248/205.2

(56) References Cited

U.S. PATENT DOCUMENTS

| | | | |
|---|---|---|---|
| 4,225,142 | * | 9/1980 | Zolt ..................................... 274/39 A |
| 4,560,136 | * | 12/1985 | Basore ................................. 248/559 |
| 4,837,590 | * | 6/1989 | Sprague ............................... 346/145 |
| 4,931,950 | * | 6/1990 | Isle et al. ............................. 364/513 |
| 5,212,628 | * | 5/1993 | Bradbury ............................. 361/395 |
| 5,226,540 | * | 7/1993 | Bradbury ............................. 206/576 |
| 5,242,056 | * | 9/1993 | Zia et al. ............................. 206/576 |
| 5,305,183 | * | 4/1994 | Teynor ................................. 361/686 |
| 5,325,970 | * | 7/1994 | Dillon et al. ......................... 206/576 |
| 5,404,583 | * | 4/1995 | Lalezari et al. ...................... 455/90 |
| 5,442,512 | * | 8/1995 | Bradbury ............................. 361/683 |
| 5,552,957 | * | 9/1996 | Brown et al. ........................ 361/683 |
| 5,570,780 | * | 11/1996 | Miller .................................. 206/305 |
| 5,590,022 | * | 12/1996 | Harvey ................................ 361/683 |
| 5,633,782 | * | 5/1997 | Goodman et al. ................... 361/683 |
| 5,647,484 | * | 7/1997 | Fleming .............................. 206/576 |
| 5,857,568 | * | 1/1999 | Speirs .................................. 206/320 |
| 5,883,820 | * | 3/1999 | Ota et al. ........................... 364/708.1 |
| 5,884,768 | * | 3/1999 | Fox ..................................... 206/522 |
| 6,105,508 | * | 8/2000 | Ryburg ................................ 108/42 |
| 6,116,418 | * | 9/2000 | Sadow ................................ 206/320 |

FOREIGN PATENT DOCUMENTS

4032959 * 4/1992 (DE) ............................. A45C/11/00

* cited by examiner

*Primary Examiner*—Leo P. Picard
*Assistant Examiner*—Anatoly Vortman
(74) *Attorney, Agent, or Firm*—Morland C. Fischer

(57) ABSTRACT

A portable office having a shock resistant case within which to carry a computer workstation that includes a personal computer and one or more computer peripherals. In an as-packaged configuration, the computer workstation is detachably connected to a flat table surface that extends across the carrying case. In a detached configuration, the computer workstation is lifted off the table surface and separated from the carrying case to be transported to a remote worksite outside the confines to the carrying case. A shock isolation system suspends the computer workstation above the carrying case and absorbs potentially damaging impact forces and vibrations that are created when the carrying case is subjected to physical forces during the transit. The shock isolation system also permits the computer workstation to be operated from a moving motor vehicle.

15 Claims, 6 Drawing Sheets

PORTABLE OFFICE HAVING A REMOVABLE COMPUTER WORKSTATION AND SHOCK ISOLATION MEANS THEREFOR

BACKGROUND OF THE INVENTION

1. Field of the Invention

This invention relates to a compact, light weight portable office having a computer workstation to be transported from place-to-place within and removed from an impact resistant carrying case. The carrying case is provided with a shock isolation system to absorb shock and dampen low frequency vibrations whereby to reduce the risk of damage to the workstation during shipment and enable the workstation to be used in a moving motor vehicle.

2. Background Art

Compact portable offices containing a personal computer, a printer and other peripherals packaged within a carrying case have been commercially available for many years. Because of space constraints, the user is often required to remove either the computer or the printer from the case before access can be gained to each. In certain situations, a printer and other conventional peripherals cannot be easily packaged within the same carrying case, making it necessary for the user to have access to an external printer and/or to other computer peripherals. In other situations, because the computer and peripherals are packaged tightly together within the carrying case, it is sometimes difficult and time consuming to attach cables between the computer and the peripherals so as to be able to use the components as an integrated workstation. In the event that the computer and/or peripherals are to be removed from the case, there is often no available set-up surface for the user to conveniently and efficiently arrange the components of the portable office for use.

One of the advantages of a portable office is its ability to be transported from place-to-place. The portable office is transported in its carrying case over long distances during which the computer and peripherals are often subjected to impact forces. Such impact forces could damage the computer and/or the peripherals. That is to say, where the modular components of the portable office are usually packed closely together within the carrying case, the impact forces are undesirably transmitted throughout the case. Where the modular components are free to move around the carrying case, they have been known to impact one another. However, there is no readily available means known to absorb the forces to which the carrying case is exposed during transit whereby to avoid damage to the components of the portable office. What is more, it has not been practical to use the workstation in a moving motor vehicle without subjecting the computer to engine and road induced vibrations that could adversely affect the operation of the computer drives.

Examples of portable offices comprising a modular computer workstation are available by referring to any of the following United States patents, all of which being assigned to the assignee of this application:

U.S. Pat. No. 5,212,628 issued May 18, 1993
U.S. Pat. No. 5,226,540 issued Jul. 13, 1993
U.S. Pat. No. 5,442,512 issued Aug. 15, 1995
U.S. Pat. No. 5,590,022 issued Dec. 31, 1996

SUMMARY OF THE INVENTION

A compact, light weight portable office is disclosed having a shock resistant carrying case in which a computer workstation is housed and transported from place-to-place. The carrying case includes a cover that is detachable from a body. The computer workstation includes a personal computer and one or more peripherals such as, for example, a printer, a cellular telephone, a scanner, a battery charger, and the like. The computer and the computer peripherals of the workstation are seated upon a flat, generally rectangular base plate. In an as-packaged configuration of the computer workstation, with the cover of the carrying case located over the body, the base plate is detachably connected to a flat, generally rectangular table surface. The table surface extends above and across the body of the carrying case so that a hollow chamber is established between the table surface and the body. A battery for powering the workstation is carried within the hollow chamber of the carrying case.

A plurality of locking caps project upwardly from the table surface for receipt through respective holes formed in the base plate. A corresponding plurality of slidable locking clips are adapted to be moved in a first direction over the base plate so as to engage respective ones of the locking caps, whereby to hold the base plate with the computer workstation seated thereon against the table surface. However, with the cover of the carrying case detached form the body to permit access to the workstation, the slidable locking clips can be moved in an opposite direction over the base plate and out of engagement with the locking caps. In a detached configuration of the workstation, the base plate is removed from the body of the carrying case and lifted off the table surface to permit the workstation to be carried to a suitable worksite at which the computer and/or any of the peripherals of the workstation can be conveniently used outside the confines of and the space limitations imposed by the carrying case.

A shock isolation system is located in the hollow chamber of the carrying case below the table surface. According to one embodiment of this invention, a pair of helical springs extend laterally and in parallel alignment with one another through the hollow chamber. Each spring is held under a compressive load by a pair of upper and lower rails that run along the table surface and the body of the carrying case. According to an alternate embodiment of the invention, the body of the carrying case is modified so that a lip is formed along each of the opposite sides thereof. Each lip bends downwardly and inwardly so as to lie below the table surface that covers the hollow chamber. A set of helical springs are located between each of the opposing lips of the body and the table surface.

With the cover of the carrying case closed atop the body and the computer workstation in the as-packaged configuration, the shock isolation systems according to the first and alternate embodiments act to suspend the flat table surface so that the computer workstation floats within the carrying case. Accordingly, impact forces to which the portable office is subjected during transit are absorbed. Therefore, the computer workstation is less likely to sustain damage that might otherwise occur with a conventional carrying case. The shock isolation systems also suspend the computer workstation in order to dissipate low frequency vibrations when the top of the carrying case is removed from the body so that the workstation can be operated in a potentially hazardous environment and/or within a moving motor vehicle.

DETAILED DESCRIPTION

Figure 1:
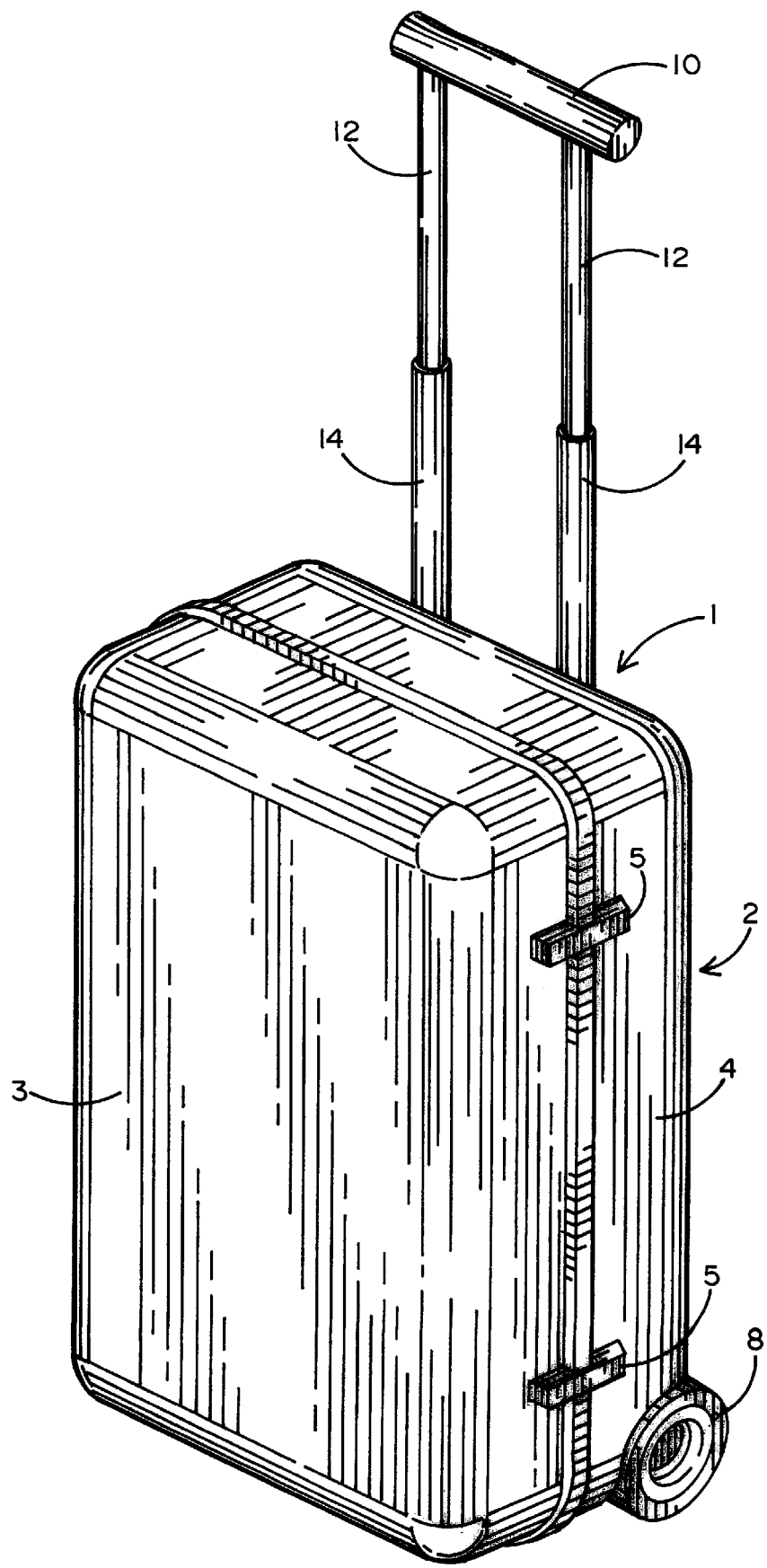
FIGS. 1 and 2 show a carrying case of the portable office which forms that present invention.
Figure 2:
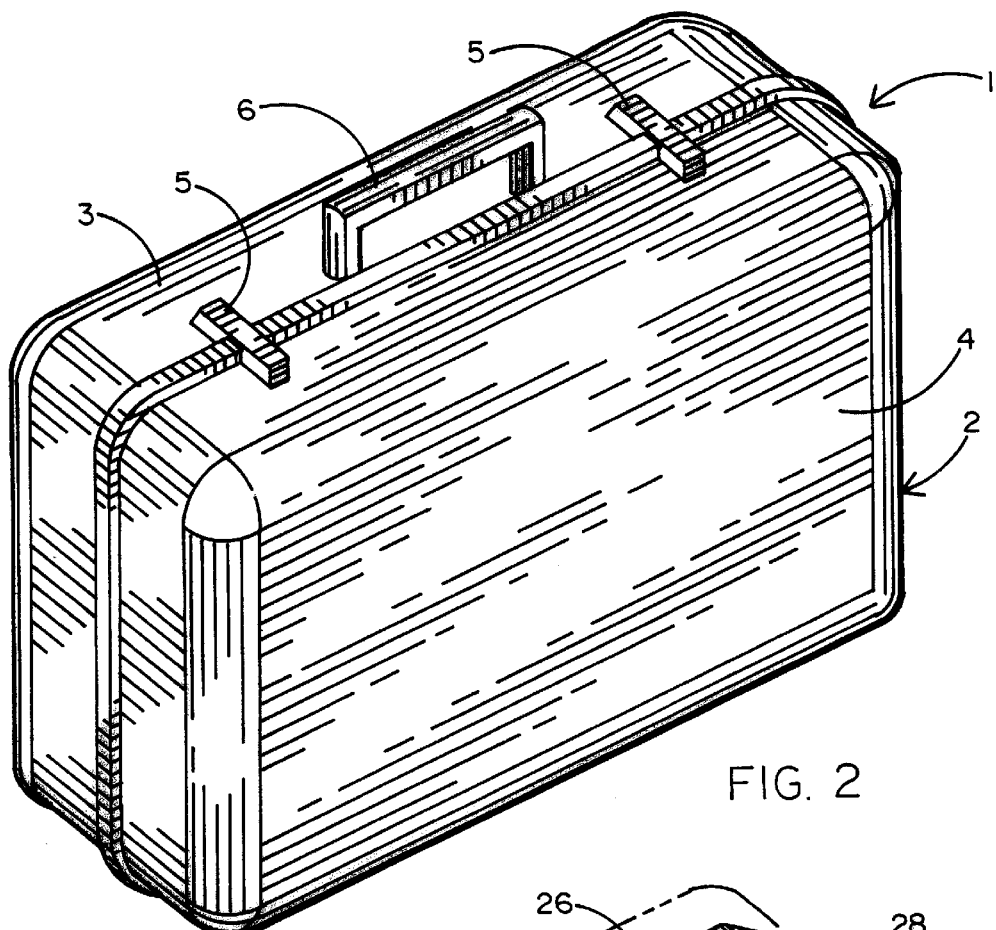
Figure 3:
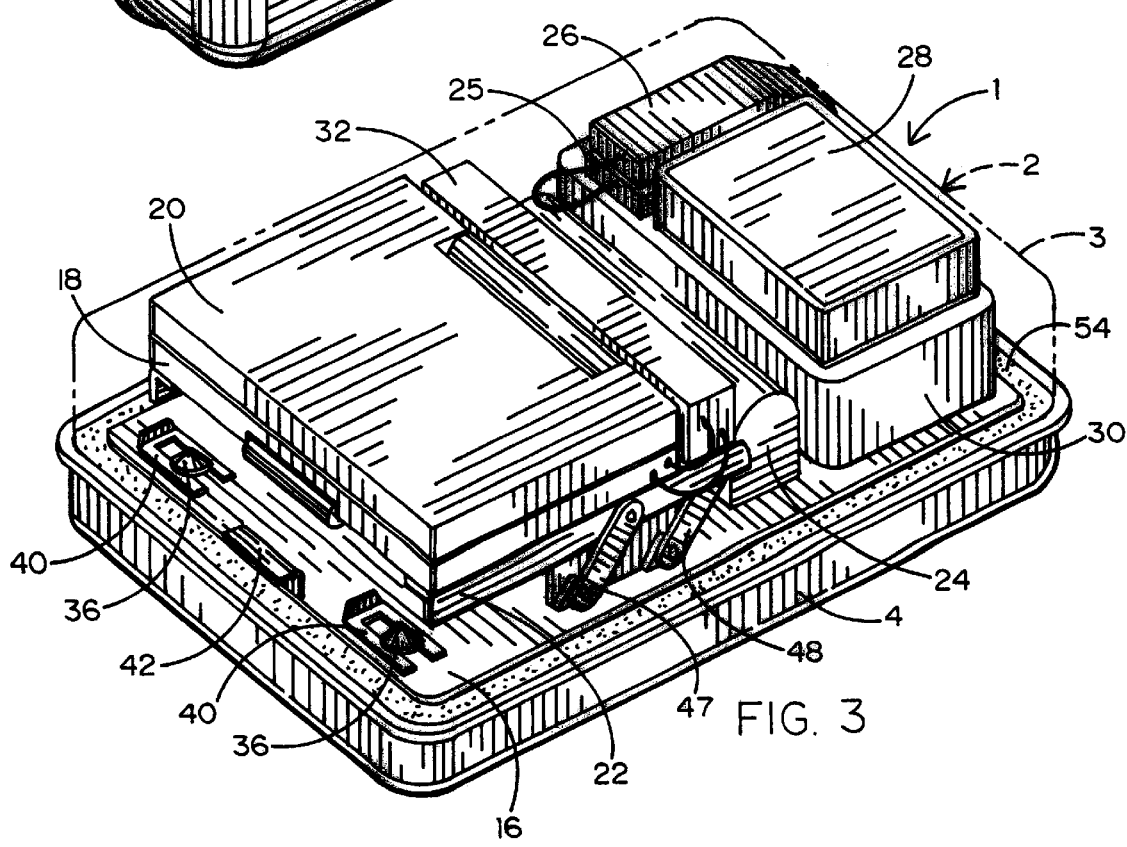
FIG. 3 shows a computer workstation of the portable office in an as-packed configuration within the confines of the carrying case.

The compact, light weight portable office 1 with shock absorbing means which forms the present invention is initially described while referring concurrently to FIGS. 1–3 of the drawings. The portable office 1 includes a carrying case 2 which is preferably manufactured from an impact resistant material (e.g. ABS plastic), and includes a cover 3 that is detachably connected to a body 4 by means of latches 5 so as to be removable from the body. A handle 6 is attached to the carrying case 2 to permit the case to be transported when the cover 3 is closed over top of the body 4. As is best shown in FIG. 3, the cover 3 is removed from the body 4 when it is desirable to gain access to or remove a computer workstation from the carrying case 2.

As is best shown in FIG. 1, the carrying case 2 may include a pair of optional wheels 8 coupled to the body 4 (only of one of which being shown) so as to facilitate transporting the portable office 1 over long distances. In this same regard, the carrying case 2 may also include an elongated pulling grip 10 coupled to the body 4 and having a variable length. That is to say, the elongated pulling grip 10 includes pairs of telescoping members 12 and 14 that are slidable one within the other to adjust the overall length of the grip 10 to suit the needs of the user. It may be appreciated that either the handle 6 or the elongated pulling grip 10 may be used to transport the carrying case 2 depending upon the distance over which the portable office 1 is to be transported.

FIG. 3 shows the portable office 1 with the cover 3 detached and removed from the body 4 of carrying case 2. The portable office 1 includes a computer workstation having modular hardware components that are fully integrated and conveniently carried upon a flat, generally rectangular base plate 16 so as to be suitable for use both within and outside of carrying case 2. As will be disclosed in greater detail when referring to FIG. 6, the base plate 16 cooperates with a shock isolation system to stabilize the computer workstation when the carrying case 2 is transported from place-to-place and when the workstation is operated within the carrying case such as from a motor vehicle so as to prevent damage as a consequence of physical forces (e.g. impact forces and vibrations).

Figure 5:
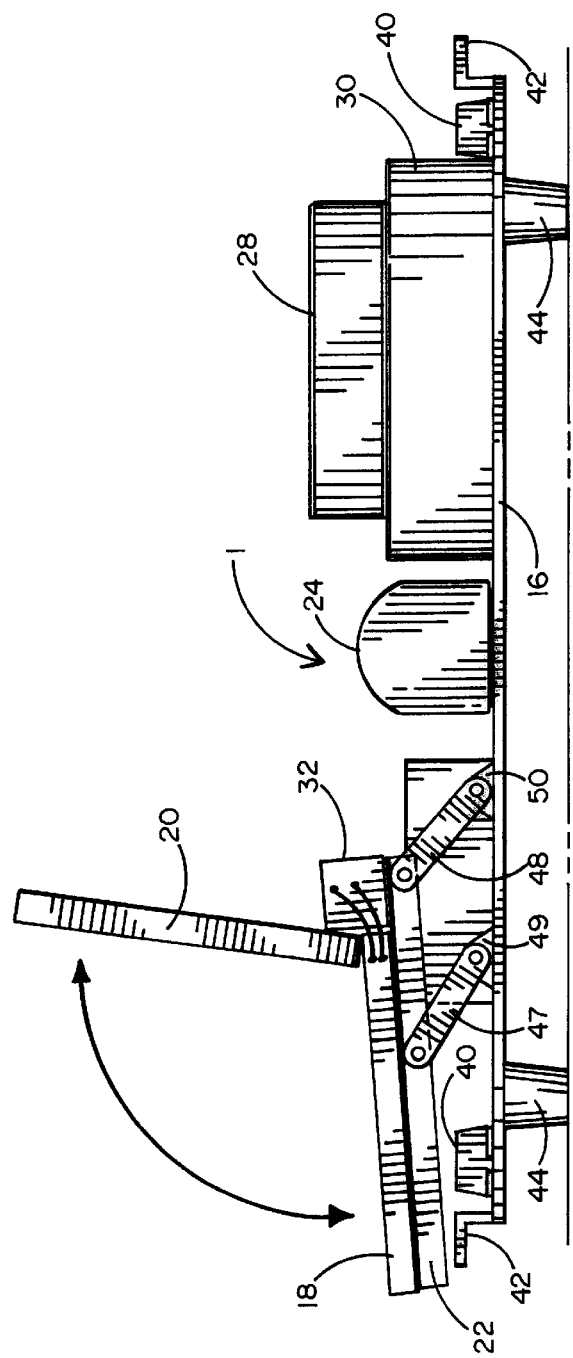
FIG. 5 shows the computer workstation in the detached configuration at a remote worksite relative to the carrying case.

Seated upon the base plate 16 is the workstation including a conventional notebook or lap top personal computer 18. As is best shown in FIG. 5, the personal computer 18 includes a tilt-up screen 20 that is rotatable from a closed configuration (as shown in FIG. 3) to a raised configuration (as shown in FIG. 5). The computer 18 is carried by a slidable computer tray 22. As will soon be described, the tray 16 is adapted to be displaced relative to the flat base plate 16 between retracted and extended positions so that the location of the personal computer 18 can be selectively adjusted to suit the needs of a user.

The workstation within the carrying case 2 of portable office 1 also includes a variety of conventional computer peripherals. By way of example only, the workstation of portable office 1 includes an optical scanner 24, a cellular telephone 25 including a corresponding hand set 26, a computer printer 28, and a power pack 30 containing a (e.g. 12 volt lead-acid) battery and a battery charger (not shown) so that the workstation can be powered from an internal battery or an external voltage source. It should be understood that the present invention is not limited to the aforementioned list of computer peripherals, such that some of these peripherals can be eliminated from the workstation and other peripherals (e.g. a digital camera) may be included within carrying case 2.

To facilitate the efficient and space conserving interconnection of the computer 18 with the computer peripherals (e.g. the computer printer 28) and thereby eliminate the bulky cable runs that have undesirably increased the size and weight of conventional portable offices, the computer 18 is detachably connected to an elongated docking channel 32 that is also carried by the computer tray 22. The docking channel 32 provides a hollow housing that routes power and communications conductors from the computer peripherals to a first set of electrical connectors (not shown) on the docking channel 32. The computer is plugged into a second set of electrical connectors on the docking channel 32, whereby the computer 18 will be directly connected to the peripherals within carrying case 2. The docking channel 32 of the portable office 1 is identical to the docking channel described in my earlier U.S. Pat. No. 5,590,022 issued Dec. 31, 1996, the teachings of which are incorporated herein by reference. Therefore, the complete details of docking channel 32 and the conductors routed therethrough will not be explained in this application.

Figure 4:
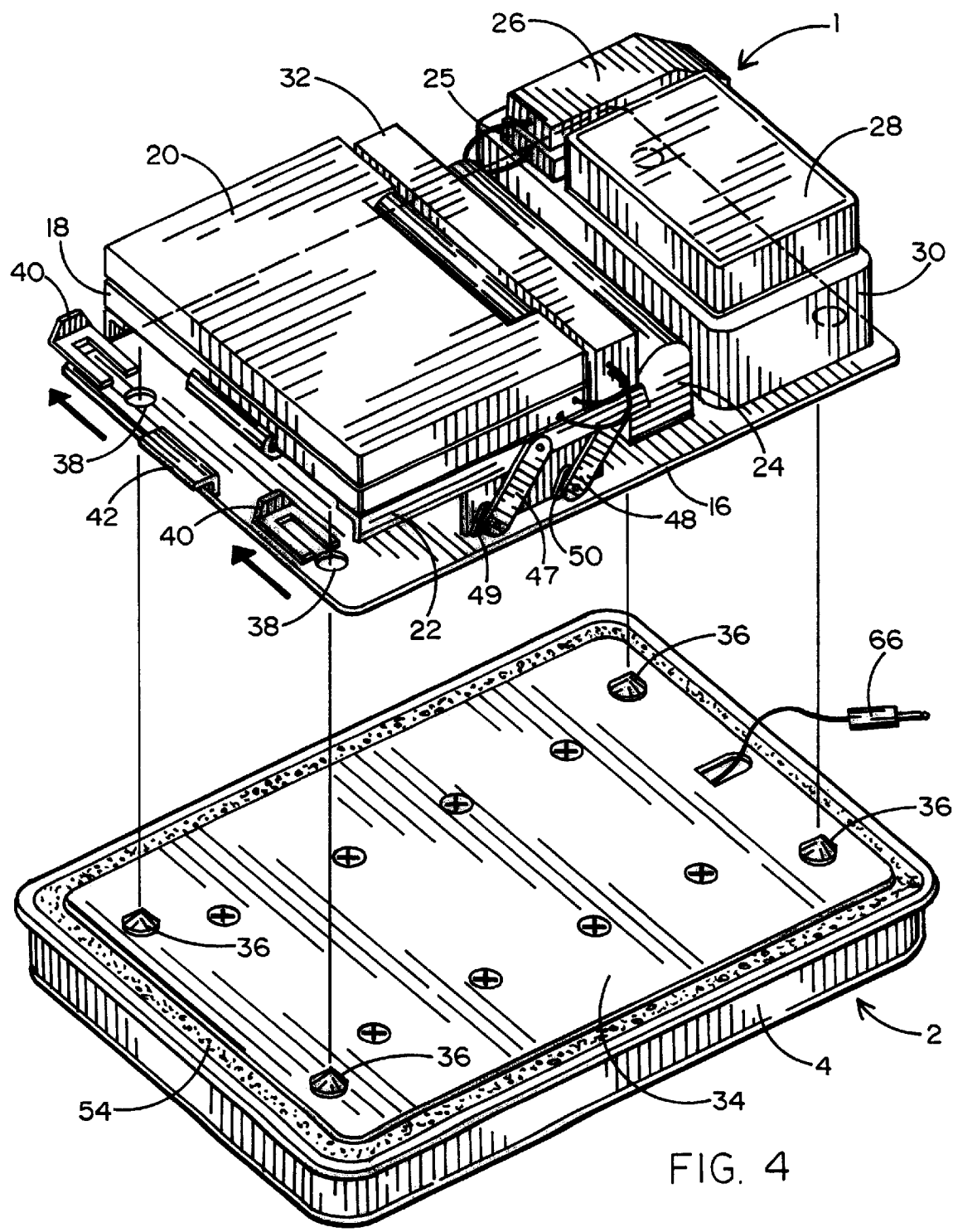
FIG. 4 shows the computer workstation of the portable office in a detached configuration outside the confines of the carrying case.

An important improvement of the present invention is described while referring concurrently to FIGS. 3–5 of the drawings. More particularly, the flat base plate 16, upon which the computer 18 and the computer peripherals of the workstation are seated, may be removed from the body 4 of carrying case 2 so that the computer workstation of the portable office can be carried to and used at a remote worksite. In addition, either the same or a different workstation can be returned to the body 4 of carrying case 2. As is best shown in FIG. 4, a flat and generally rectangular table surface 34 extends substantially across the body 4 of carrying case 2. The table surface 34 is spaced above the bottom of the body 4 for an important purpose that will be described when referring to FIGS. 6 and 7.

Projecting upwardly from each corner of the table surface 34 is a locking cap 36. With the computer workstation in the as-packaged, case dependent configuration of FIG. 3, the base plate 16, upon which the computer 18 and the peripherals are seated, is laid on and supported from the table surface 34. A hole 38 is formed at each corner of the base plate 16. The holes 38 are axially aligned with and sized to receive respective locking caps 36 therethrough. With the base plate 16 supported upon the table surface 34, each locking cap 36 of table surface 34 extends upwardly and through a corresponding hole in the base plate 16.

Two pairs of slidable locking clips 40 having locking fingers are attached to the base plate 16 so as to move thereacross relative to the holes 38 formed in the base plate 16. Each locking clip 40 is adapted to slide towards or away from a corresponding hole 38 in response to a pushing or pulling force applied thereto. As is shown in FIG. 3, in the as-packaged, case dependent configuration of the computer workstation, the locking clips 40 are pushed in a first direction so that the locking fingers thereof move into locking engagement with the locking caps 36 that are received through respective holes 38. The engagement of locking caps 36 by locking clips 40 secures the base plate 16, on which the computer workstation is seated, against the table surface 34 of the body 4 of carrying case 2. However, in the detached, case independent configuration of the workstation shown in FIG. 4, a pushing force is applied to the locking clips 40 to cause the locking clips to slide in an opposite direction so that the locking fingers are moved out of engagement with the locking caps 36. The base plate 16 can now be removed from the carrying case 2 and lifted off the table surface 34.

To facilitate the separation of the base plate 16 from the table surface 34 during the detached, case independent configuration of the computer workstation, a pair of handles 42 (best shown in FIG. 5) project upwardly and outwardly from the base plate 16. With the slidable locking clips 40 pushed out of engagement with the locking caps 36, a user may grasp the handles 42 so as to lift the base plate 16 off table surface 34 and out of the body 4 of carrying case 2. As is also best show in FIG. 5, a set of legs 44 projects downwardly from the base plate 16. Thus, the base plate 16 and the computer workstation may be conveniently moved to any suitable flat surface with the legs 44 supporting the weight of the workstation. The user will now be able to deploy the workstation at a remote worksite outside the confines of the carrying case 2 and without the space limitations that would normally be imposed by the carrying case. Accordingly, the tilt-up screen 20 of the computer 18 may be raised and any one or more of the computer peripherals (e.g. optical scanner 24, cellular telephone 25 and the computer printer 28) may be used in a manner that would occur in a typical office setting.

With the workstation in the detached, case independent configuration removed from the carrying case 2, the position of the computer 18 may be selectively adjusted relative to the base plate 16 in order to suit the needs of the user. That is to say, the aforementioned computer tray 22 supports the computer 18 and the tilt-up screen 20 thereof atop the base plate 16. The computer tray 22 is adapted to be advanced relative to the base plate 16 to an extended position to permit easy access to the computer 18 and to the computer peripherals which form the portable office 1.

To enable a displacement of the computer tray 16, at least one pair of arms 47 and 48 are pivotally connected between computer tray 22 and brackets 49 and 50 attached to the base plate 16. The arms 47 and 48 are adapted to rotate relative to their respective brackets 49 and 50 so as to cause the computer tray 22 and the computer 18 seated thereon to be moved from a retracted position as shown in FIG. 3 when the base plate 16 is secured to the body 4 of carrying case 2 in the as-packaged configuration of the workstation to an extended position as shown in FIG. 5 when the base plate 16 is removed from the carrying case 2 and lifted off the table surface 34 in the detached configuration of the workstation. In this same regard, reference may be made to U.S. Pat. No. 5,212,628 issued May 18, 1993 for another example of a computer tray that carries a personal computer between retracted and extended positions relative to a carrying case within which the computer is transported.

Figure 6:
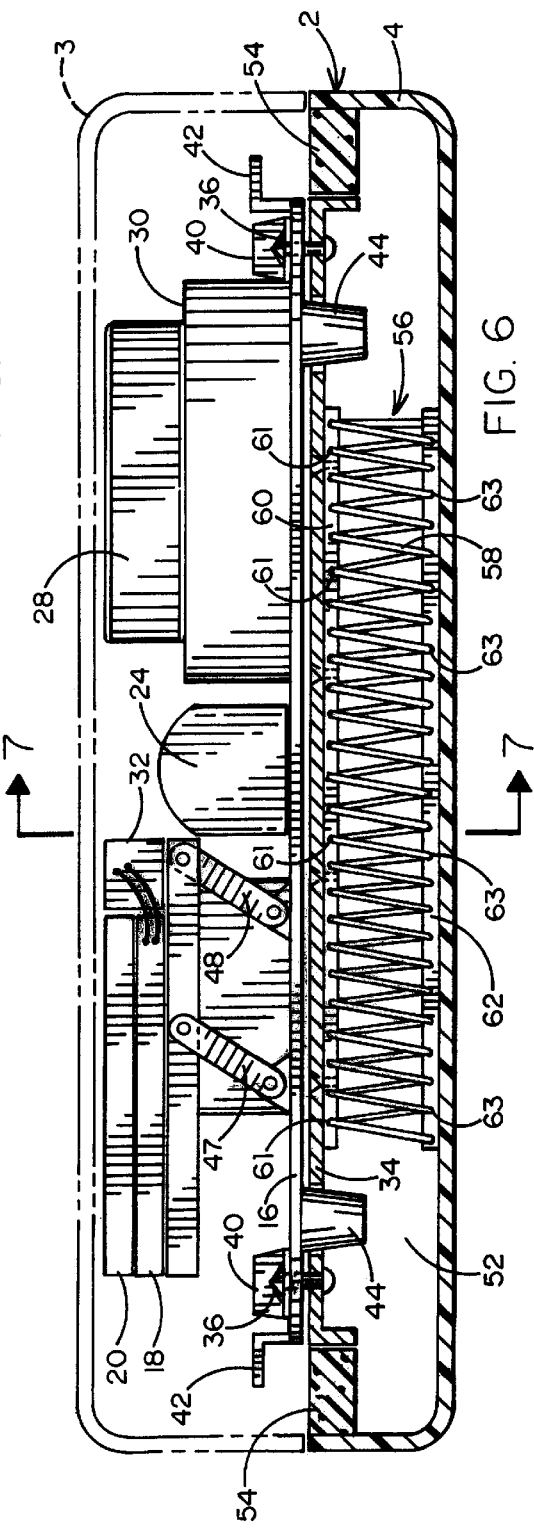
FIG. 6 shows one embodiment for a shock isolation system to suspend the computer workstation within the carrying case in the as-packaged configuration.
Figure 7:
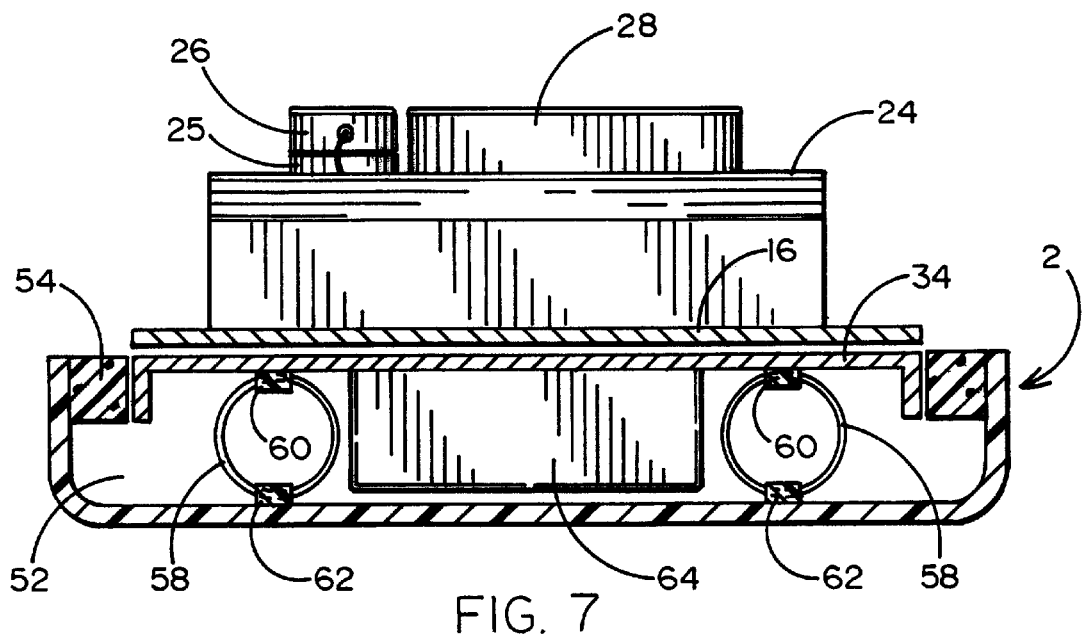
FIG. 7 is a cross-section taken along lines 7—7 of FIG. 6.

Turning now to FIGS. 6 and 7 of the drawings, another important feature of the present invention is described. When the base plate 16 on which the workstation is seated is returned to the body 4 of carrying case 2 to be secured to the table surface 34 (by means of sliding the locking clips 40 into engagement with respective locking caps 36), a hollow chamber 52 is established between the table surface 34 and the bottom of the body 4 of carrying case 2. A low density open cell foam liner 54 extends around the periphery of the body 4 of carrying case 2 to prevent moisture, dust and other unwanted debris from falling through the space between the body 4 and the table surface 34.

Located within the hollow chamber 52 below table surface 34 is a shock isolation system 56. The shock isolation system 56 includes one or more helical wire springs 58 that are adapted to work with a compressive load. As is best shown in FIG. 7, the shock isolation system 56 includes a pair of parallel aligned helical springs 58 that run laterally through the hollow chamber 52 below table surface 34. However, it is to be understood that the precise number and type of spring which forms the shock isolation system 56 should not be regarded as a limited of this invention and any suitable number and type of spring (e.g. an elastomeric spring) can be substituted for the pair of helical springs 58 as shown.

A pair of upper rails 60 extend along the underside of the table surface 34. A pair of oppositely aligned lower rails 62 extend along the body 4 of carrying case 2. The pairs of upper and lower rails 60 and 62 have a series of holes 61 and 63 formed therein so as to slidably and loosely receive respective turns from the helical springs 58 of the shock isolation system 56. The upper and lower rails 60 and 62 maintain the pair of helical springs 58 in a compressed condition and in parallel alignment with one another through the hollow chamber 52.

In the as-packaged, case dependent configuration of FIG. 6 when the cover 3 is closed over top of the body 4, the shock isolation system 56 suspends the computer workstation of the portable office 1 within the carrying case 2 and isolates the workstation from impact forces that are often experienced when the carrying case 2 is transported from place-to-place. By way of example, the carrying case 2 may be transported in an airplane or by truck. With the helical springs 58 of the shock isolation system 56 supported below base plate 16 and table surface 34 by the upper and lower rails 60 and 62, the computer workstation will float within the carrying case 2 so as to avoid damage as a consequence of impact forces that might occur if the hardware components of the workstation were otherwise in direct receipt of such forces. In this same regard, the springs 58 of shock isolation system 56 will also stabilize the computer workstation during use when the cover 3 is detached from the body 4 of carrying case 2 as shown in FIG. 7.

As is best shown in FIG. 7, a battery 64 is suspended within the hollow chamber 52 at the underside of the table surface 34. A cable having a cable connector 66 (best shown in FIG. 4) is provided to connect the battery 64 of hollow chamber 52 in electrical parallel with the battery located within the power pack 30 of the workstation. In this way, with the workstation in the as-packaged, case dependent configuration (of FIG. 7), the computer and peripherals can be powered from either an external AC or DC voltage source or the pair of parallel connected batteries 30 and 64. However, with the workstation in the detached, case independent configuration (of FIG. 5), the computer and peripherals are powered solely from the battery pack 30 or an external voltage source.

Figure 8:
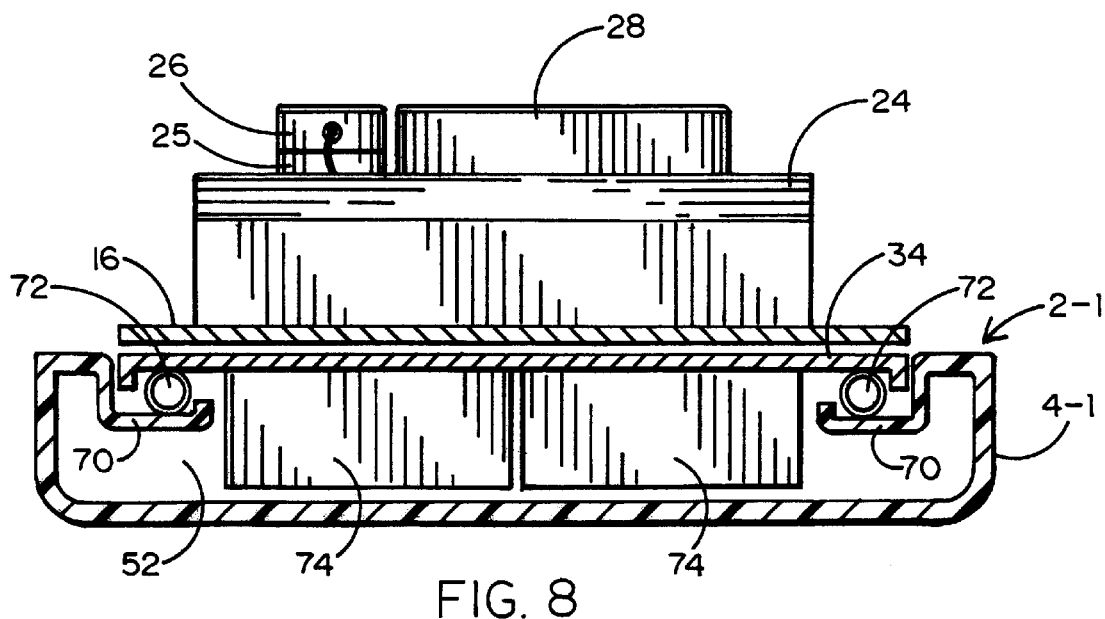
FIG. 8 shows an alternate embodiment for a shock isolation system to suspend the computer workstation within the carrying case in the as-packed configuration.

Referring now to FIG. 8 of the drawings, there is shown a modification to the shock isolation system 56 of FIGS. 6 and 7. More particularly, the body 4-1 of the carrying case 2-1 is provided with either a single continuous lip (not shown) or a pair of lips 70 that extend along each of the opposite sides of body 4-1. Each lip 70 bends downwardly and inwardly so as to lie below the flat table surface 34. A set of helical wire springs 72 are located between the opposing lips 70 and the table surface 34. In a preferred embodiment, a total of four helical springs 72 are positioned at the four corners of the body 4-1. Therefore, like the helical springs 58 of the shock isolation system 56 of FIGS. 6 and 7, the helical springs 72 suspend the computer workstation of portable office 1 within carrying case 4-1 and isolate the workstation from shock and other physical forces so as to reduce the possibility that the computer 18 and the peripherals thereof will be subjected to damage during transit within the carrying case 2-1. That is to say, with the cover closed over top of the body 4-1 of carrying case 2-1 in the as-packaged, case dependent configuration of the computer workstation, the helical springs 72 absorb the impact forces to which the workstation would otherwise be subjected.

In the embodiment of FIG. 8, a pair of batteries 74 that are connected in electrical parallel 74 are suspended within the hollow chamber 52 at the underside of the table surface 34 so as to prolong the power available for operating the computer and peripherals of the workstation.

It may be appreciated that the dimensions of the helical shock isolation springs 58 and 72 of FIGS. 6–8 can be selected to achieve any desired frequency response depending upon the application and location of portable office 1 during use. However, both of the shock isolation systems described herein are provided to permit the computer and computer peripherals to float by suspending the base plate 16 and the computer workstation above the carrying cases 2 and 2-1. By virtue of the foregoing, the portable office 1 of the present invention can be conveniently operated while the cover is detached from the body of the carrying case and safely transported with the cover attached to the body while moving through a potentially hostile or hazardous environment and over terrain that could prove to be damaging to a portable office that is transported in a conventional carrying case.

When it is desirable to operate the workstation of the portable office in a moving vehicle, a platform (not shown) having the shape and function of the body 4-1 and the lips 70 of the carrying case 2-1 of FIG. 8 may be build directly into the vehicle. In this way, different workstations can be moved from vehicle-to-vehicle or from case-to-vehicle for receipt upon the flat table surface 34 which remains suspended above the lips 70 of the platform by means of the springs 72 of the vehicle mounted shock isolation system. The springs 72 will advantageously dampen noise and vibrations generated by the engine of the motor vehicle and by relatively smooth roadways that could adversely effect the operation of the computer drives.

Figure 9:
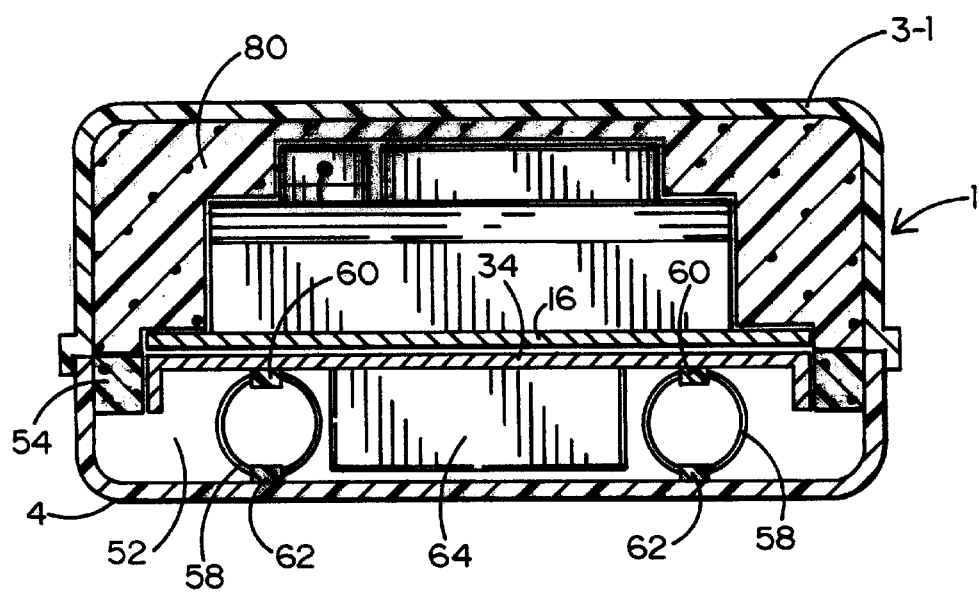
FIGS. 9 and 10 show the removable top of the carrying case having a shock absorbing liner to enclose the workstation in the as-packaged configuration.
Figure 10:
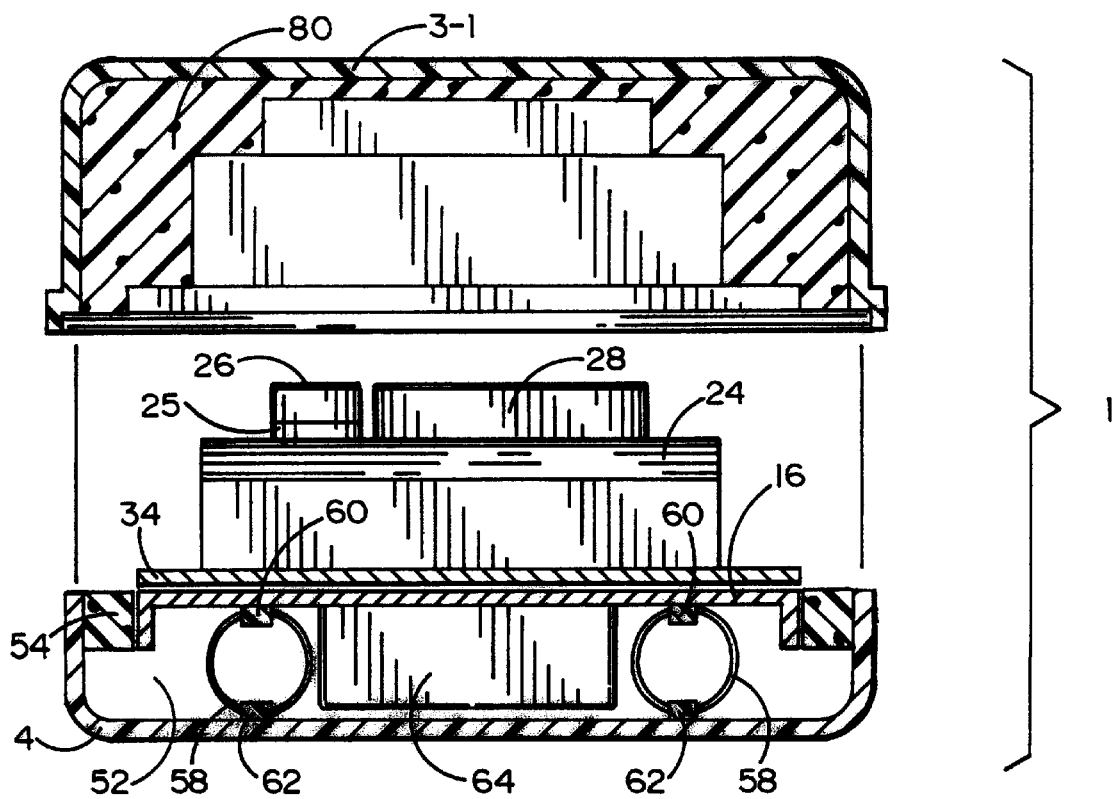

Another embodiment for the portable office 1 is illustrated at FIGS. 9 and 10 of the drawings where the cover 3-1 of the carrying case is filled with a shock absorbing liner 80. By way of example, the liner 80 is manufactured from a closed cell foam material. The liner 80 may be cut so as to have a profile that corresponds to the profile of the workstation of the portable office 1. Therefore, when the cover 3-1 is attached to the body 4 in the as packaged, case dependent configuration, the workstation will be completely enclosed and held in place on the baseplate 16 by the shock absorbing liner. In this case, the workstation will be stabilized and unable to float within the carrying case during transit so as to be insulated against damage from impact forces that might otherwise occur if the computer and the peripherals were allowed to move freely around the carrying case.

I claim:

1. A portable office comprising a carrying case and a workstation to be enclosed by and transported within said carrying case, said carrying case having a body and a removable cover connected to said body, and said workstation having a computer and at least one computer peripheral, said carrying case also having a base plate upon which said workstation is seated, said base plate being removably attached to said body and adapted to be removed from the carrying case in order to carry said workstation from place-to-place, and the body of said carrying case having a first set of locking means and the base plate of said carrying case upon which said workstation is seated having a second set of locking means, and first and second sets of locking means cooperating with one another so that said plate is removably attached to said body.

2. The portable office recited in claim 1, wherein said base plate has a set of legs projecting downwardly therefrom to support the weight of the workstation when said base plate is detached from said body and removed from the carrying case to carry said workstation to a working surface.

3. The portable office recited in claim 1, further comprising a plurality of locking caps projecting from the body of said carrying case, said base plate having a corresponding plurality of holes formed therein to removably receive respective ones of said plurality of locking caps so that said base plate upon which said workstation is seated is removably attached to said body.

4. The portable office recited in claim 3, wherein said base plate also has a plurality of sliding locking clips mounted thereon, said plurality of locking clips sliding in a first direction and into locking engagement with respective ones of said plurality of locking caps whereby to attach said base plate to said body, and said plurality of locking clips sliding in an opposite direction and out of locking engagement with said plurality of locking caps whereby to release said base plate from said body.

5. The portable office recited in claim 4, wherein said base plate has a set of handles to which a lifting force is applied so as to detach said base plate from said body and remove said base plate from the carrying case when said plurality of locking clips slide in said opposite direction and out of engagement with said plurality of locking caps.

6. The portable office recited in claim 3, further comprising a table surface located within the body of said carrying case, said plurality of locking caps connected to and projecting upwardly from said table surface, said base plate resting upon said table surface such that said plurality of locking caps which project upwardly from said table surface are removably received through said corresponding plurality of holes formed in said base plate so that said base plate is removably attached to said body at said table surface.

7. The portable office recited in claim 6, further comprising at least one spring located between said table surface and the body of said carrying case, said at least one spring absorbing impact forces and dampening vibrations to which said body is subjecting for isolating the workstation from said impact forces and vibrations when the base plate upon which said workstation is seated is resting upon said table surface.

8. The portable office recited in claim 7, wherein said table surface upon which said base plate is resting is suspended within the body of said carrying case by means of said at least one spring so that a chamber is established between said table surface and said body, said portable office further comprising at least one battery located within said chamber to provide power to the workstation seated upon said base plate.

9. The portable office recited in claim 8, further comprising a pair of rails located within the chamber of the body of said carrying case for holding said at least one spring within said chamber, a first rail of said pair of rails attached to said table surface and a second rail of said pair of rails attached to said body, each of said pair of rails having holes formed therein through which said at least one spring is slidably received.

10. The portable office recited in claim 7, wherein the body of said carrying case has a lip extending around at least some of the periphery of said body, said lip projecting inwardly from said body so as to lie below said table surface, said at least one spring located between said lip and said table surface to suspend said base plate upon which said workstation is seated above said lip.

11. The portable workstation recited in claim 1, wherein the removable cover of said carrying case has a shock absorbing liner that conforms to the shape of said workstation so as to surround said workstation when said cover is connected to said body.

12. A portable office comprising a workstation having a computer and at least one computer peripheral, said portable office also comprising:

a base plate upon which said workstation is seated;

a body spaced from said base plate; and at least one spring extending longitudinally between said body and said base plate, said at least one spring suspending said base plate above said body so as to absorb impact forces and dampen vibrations to which said base plate is subjected for isolating the workstation from said impact forces and vibrations.

13. The portable office recited in claim 12, wherein said body has a lip extending around at least some of the periphery of said body, said lip projecting inwardly of said body so as to lie below said base plate, said at least one spring located between said lip and said base plate upon which the workstation is seated to suspend said base plate above said lip.

14. The portable office recited in claim 12, wherein said body has a first set of locking means and said base plate upon which the workstation is seated has a second set of locking means, said first and second sets of locking means cooperating with one another so that said base plate is removably attached to said body.

15. The portable office recited in claim 12, further comprising a table surface suspended above said body by said at least one spring and upon which said base plate is received, said table surface having a plurality of locking caps projecting therefrom, and said base plate having a corresponding plurality of holes formed therein to removably receive respective ones of said plurality of locking caps so that said base plate upon which said workstation is seated is removably attached to said table surface.

* * * * *